(12) United States Patent
Zou et al.

(10) Patent No.: US 10,324,548 B2
(45) Date of Patent: Jun. 18, 2019

(54) MOBILE TERMINAL, TOUCH DISPLAY DEVICE AND TOUCH BUTTON

(71) Applicant: Wuhan China Star Optoelectronics Technology Co., Ltd., Wuhan, Hubei (CN)

(72) Inventors: Gonghua Zou, Guangdong (CN); Qingcheng Zuo, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 321 days.

(21) Appl. No.: 15/117,846

(22) PCT Filed: Jul. 11, 2016

(86) PCT No.: PCT/CN2016/089631
§ 371 (c)(1),
(2) Date: Aug. 10, 2016

(87) PCT Pub. No.: WO2017/215059
PCT Pub. Date: Dec. 21, 2017

(65) Prior Publication Data
US 2018/0196534 A1   Jul. 12, 2018

(51) Int. Cl.
*G06F 3/041* (2006.01)
*H04M 1/02* (2006.01)
(Continued)

(52) U.S. Cl.
CPC ............ *G06F 3/041* (2013.01); *G06F 1/1626* (2013.01); *G06F 1/1643* (2013.01);
(Continued)

(58) Field of Classification Search
CPC ...... G06F 3/041; G06F 1/1626; G06F 1/1643; G06F 1/1671; G06F 3/0416; G06F 3/044; H04M 1/026
See application file for complete search history.

(56) References Cited

U.S. PATENT DOCUMENTS 8,427,435 B2   4/2013   Takahashi et al.
2008/0170195 A1*   7/2008   Kwon .................. G02F 1/1309
349/143
(Continued)

FOREIGN PATENT DOCUMENTS

CN          204707111 U    10/2015

*Primary Examiner* — Hong Zhou
(74) *Attorney, Agent, or Firm* — Andrew C. Cheng

(57) ABSTRACT

The present application discloses a mobile terminal, and its touch display device, and a touch button, the touch button including a touch sensor, a first switch group and a second switch group; each switch group including a plurality of switches, terminals of the switches of the first switch group are respectively connected to the touch panel, the other terminals are connected to the touch sensor respectively; terminals of the switches of the second switch group are respectively connected to the touch sensor, the other terminals are connected to the liquid crystal module; the touch sensor is overlapped with the touch button area of the touch display device. By adding the switches and the switching control signal of the touch button performing multiplexing to the Cell test PAD, and use the cell test PAD as the sensor of the extension region, and further integrate the additional Touch function into the Cell.

12 Claims, 4 Drawing Sheets

(51) Int. Cl.
*G06F 1/16* (2006.01)
*G06F 3/044* (2006.01)

(52) U.S. Cl.
CPC .......... *G06F 1/1671* (2013.01); *G06F 3/0416* (2013.01); *H04M 1/026* (2013.01); *G06F 3/044* (2013.01); *H04M 2250/22* (2013.01)

(56) References Cited

U.S. PATENT DOCUMENTS

| | | | |
|---|---|---|---|
| 2009/0134901 A1* | 5/2009 | Chen | G11C 29/1201 324/762.03 |
| 2012/0182258 A1 | 7/2012 | Kubo et al. | |
| 2014/0139509 A1* | 5/2014 | Kim | G09G 3/3275 345/212 |
| 2014/0176169 A1* | 6/2014 | Cheng | G01R 31/2884 324/750.3 |
| 2015/0049262 A1 | 2/2015 | Liao | |
| 2016/0105952 A1 | 4/2016 | Park et al. | |

\* cited by examiner

MOBILE TERMINAL, TOUCH DISPLAY DEVICE AND TOUCH BUTTON

FIELD OF THE INVENTION

The present application relates to a touch control of the touch display in the mobile terminal, and more particularly to a mobile terminal and its touch display device and touch button.

BACKGROUND OF THE INVENTION

With the development of mobile phone industry, with respect to the original method of setting the touch panel on the liquid crystal panel, the study of integration the function of the touch panel and the liquid crystal panel are growing popularity. The integration of the touch panel and liquid crystal panel includes two ways of "In-cell" and the "On-cell" methods. The In-cell refers to the method of integrating the touch panel function embedding to the liquid crystal pixels; the On-cell refers to the method of embedding the touch panel function between the color filter and the polarizer. The new generation of the Oncell and Incell market share will grow rapidly in the coming years.

In the production of the touch display panel, the sensing patterns is usually disposed under the effective display area according to customer request. The function of the sensing patterns is achieved by touch the sensing patterns ways to realize independence buttons. For the liquid crystal display using the In-cell or on-cell, the more common practice is to forming the button patterns on the flexible printed circuit, FPC first, and attached the FPC to the cover plate, and finally bonding the liquid crystal display and the cover plate by adhesions.

The driving control of the touch panel is divided into two parts, which independently control the effective display area and the touch function of the sensing patterns. Referring to FIG. 1, FIG. 1 illustrate schematic structure of the touch display panel in a mobile terminal in the conventional technology, the reference numeral 1 in FIG. 1 illustrates the effective display area, the reference numeral 2 is an independent sensing pattern touch area.

From the analysis above, the conventional technology mainly has the following disadvantages: 1,the structure is complicated, requires a separate FPC sensor and two Touch control units; 2, the process is complicated, requiring an adhesion process of the FPC and cover plate.

SUMMARY OF THE INVENTION

The present application provides a mobile terminal, and its touch display device, touch button to solve the technology problem of the structure of the touch unit and the more complicated process in the conventional technology.

In order to solve the problem above, the present application provides a touch button used in the touch display device, wherein the touch button including a touch sensor, a first switch group and a second switch group; each switch group including a plurality of switches, terminals of the switches of the first switch group are respectively connected to the touch panel, the other terminals are connected to the touch sensor respectively; terminals of the switches of the second switch group are respectively connected to the touch sensor, the other terminals are connected to the liquid crystal module; the touch sensor is overlapped with the touch button area of the touch display device.

According to a preferred embodiment of the present application, the touch sensor is a test lead endplate of the touch panel display.

According to a preferred embodiment of the present application, the test lead endplate is disposed on the border of the display area of the touch display device.

According to a preferred embodiment of the present application, when the first switch group is disconnect, the second switch group is closed, the test lead endplate is used for the light-on test of the liquid crystal module; when the first switch group is closed, the second switch group is disconnect, the test lead endplate is as a touch sensor to detect the touch signal of the touch button area.

According to a preferred embodiment of the present application, the first switch group and the second switch group including three switches respectively.

According to a preferred embodiment of the present application, the number of the test lead endplate is two, and each of the test lead endplate including three lead ends, the three lead ends are connected to the switches of the first switch group and the second switch group respectively.

According to a preferred embodiment of the present application, the switch of the first switch group is TFT switch, a source electrode of the TFT switch is connected to the touch panel, a drain electrode of the TFT switch is connected to the touch sensor, and a gate electrode is connected to a switch controller.

According to a preferred embodiment of the present application, the switch of the second switch group is TFT switch, a source electrode of the TFT switch is connected to the display module, a drain electrode of the TFT switch is connected to the touch sensor, and a gate electrode is connected to a switch controller.

In order to solve the problem above, the present application provides a touch display device, the touch display device includes the touch button in the embodiment described above.

Further, the present application provides a mobile terminal, the mobile terminal includes the touch display device in the embodiment described above.

With respect to the conventional technology, the mobile terminal, and its touch display device, touch button provided in the present application, by adding the switches and the switching control signal to perform multiplexing to the Cell test PAD (test lead endplate), and use the cell test PAD as the sensor of the extension region, and further integrate the additional Touch function into the Cell. The technical improvements and advantages: 1, no additional Sensor FPC makes the structure of the touch display device more simple; 2, Eliminating the process of adhesion the FPC and the cove plate, so that the process of the touch display device is simplified; 3, improve the level of the Touch function integration; 4, improve the level of driving integration; 5, improve the utilization efficiency of the Panel.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
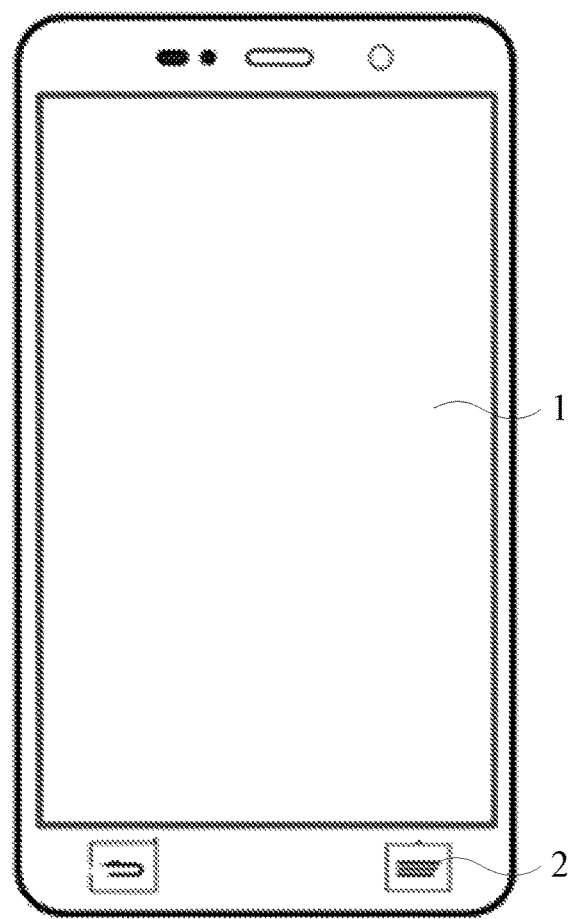
FIG. 1 illustrates a schematic structure of the touch display panel in a mobile terminal in the conventional technology.
Figure 2:
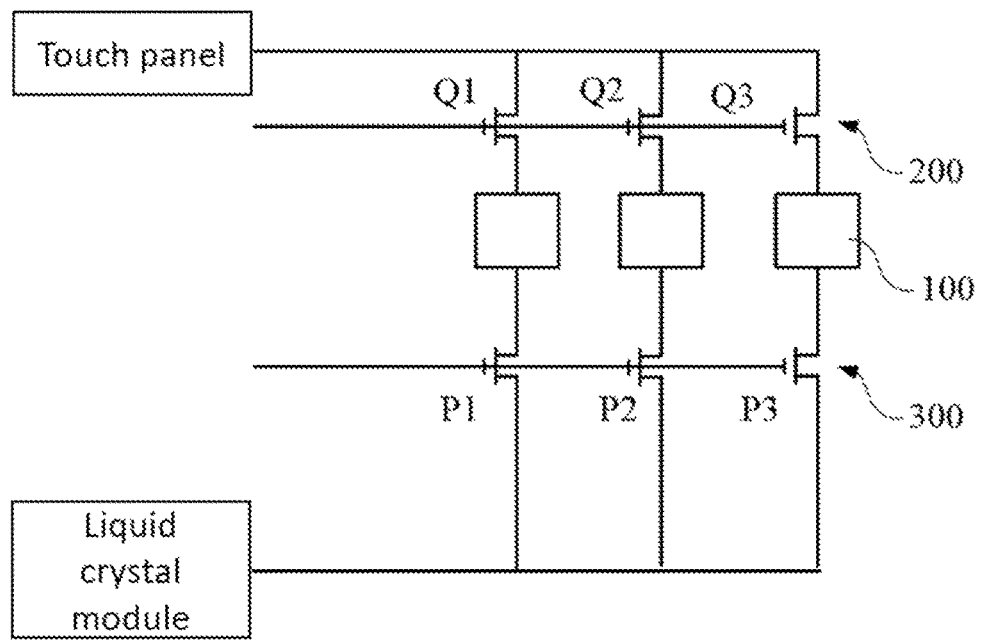
FIG. 2 illustrates a schematic circuit structure of the touch button according to a preferred embodiment of the present application.
Figure 3:
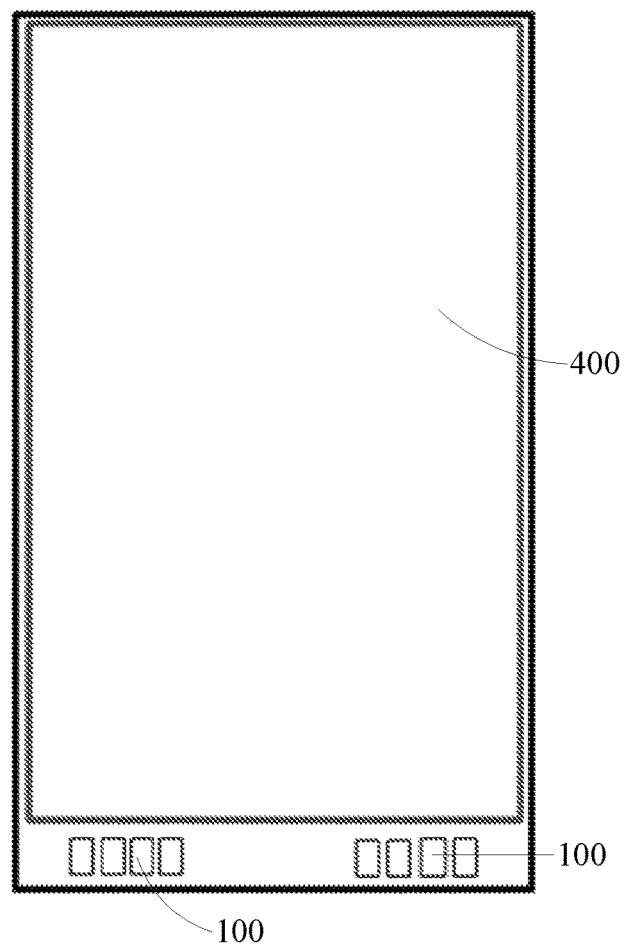
FIG. 3 illustrates a schematic structure of a touch display device.

Referring to FIGS. 2 and 3, FIG. 2 illustrates a schematic circuit structure of the touch button according to a preferred embodiment of the present application; FIG. 3 illustrates a schematic structure of a touch display device. The lower border areas of the liquid crystal display is a non-effective display area, usually a cell test pad is reserved respectively on the right and left sides of the lower border areas of the liquid crystal display. After finishing the lightening test of the cell, the PAD is under the status of no need to be used. By using the PAD as sensors in the present application, to multiplexing use the cell test pad.

The touch button includes a touch sensor 100, a first switch group 200 and a second switch group 300; each switch group includes a plurality of switches, terminals of the switches of the first switch group 200 are connected respectively to the touch panel, the other terminals are connected to the touch sensor 100 respectively; terminals of the switches of the second switch group 300 are connected respectively to the touch sensor 100, the other terminals are connected to the liquid crystal module; the touch sensor 100 is overlapped with the touch button area 500 of the touch display device. It should be noted that the Cell types in the embodiment of the present application can include non-embedded TP Cell, Incell, or Oncell like.

Preferably, the touch sensor 100 is a test lead endplate of the touch panel display, the test lead endplate is disposed on the border of the display area 400 of the touch display device. The first switch group 200 is disconnect, the second switch group 300 is closed, the test lead endplate is used for the light-on test of the liquid crystal module; the first switch group 200 is closed, the second switch group 300 is disconnect, the test lead endplate is as a touch sensor to detect the touch signal of the touch button area.

Specifically, the present application is multiplexing designed to the cell, the first switch group 200 (Q1, Q2, Q3 . . . illustrated in FIG.) and the second switch group 300 (P1, P2, P3 . . . illustrated in FIG.) are increased respectively in the cell test PAD of the right and left two sides; in the present embodiment, the first switch group 200 and the second switch group 300 includes three switches respectively, of course, in other embodiments, it can include a plurality of switches, the number of switches is not specifically limited here. The switch of the first switch group 200 and the second switch group 300 can be TFT switch, for example, P-type, N-type, C-type and etc. The shape of the Cell test PAD is not limited to a square shape shown in the figure, it can also be circular, etc., it can be understood by the person skilled in the art, and not list them here.

When the switch of the first switch group 200 is TFT switch, a source electrode of the TFT switch is connected to the touch panel, a drain electrode of the TFT switch is connected to the touch sensor 100, a gate electrode is connected to a switch controller or a switch signal input source (not shown), the switch controller or switch signal input source is used to provide a switching signal to the TFT switch.

When the switch of the second switch group 300 is TFT switch, a source electrode of the TFT switch is connected to the display module, a drain electrode of the TFT switch is connected to the touch sensor 100, a gate electrode is connected to a switch controller or a switch signal input source (not shown), similarly, the switch controller or switch signal input source is used to provide a switching signal to the TFT switch.

The number of the test lead endplate can be two, and each of the test lead endplate includes three lead ends, the three lead ends are connected to the switches of the first and the second switch group respectively. Of course, the number of test lead endplate can be a plurality. A touch panel control (TP control) signal is added in the input side of the right and left sides of the first switch group 200 respectively.

Figure 4:
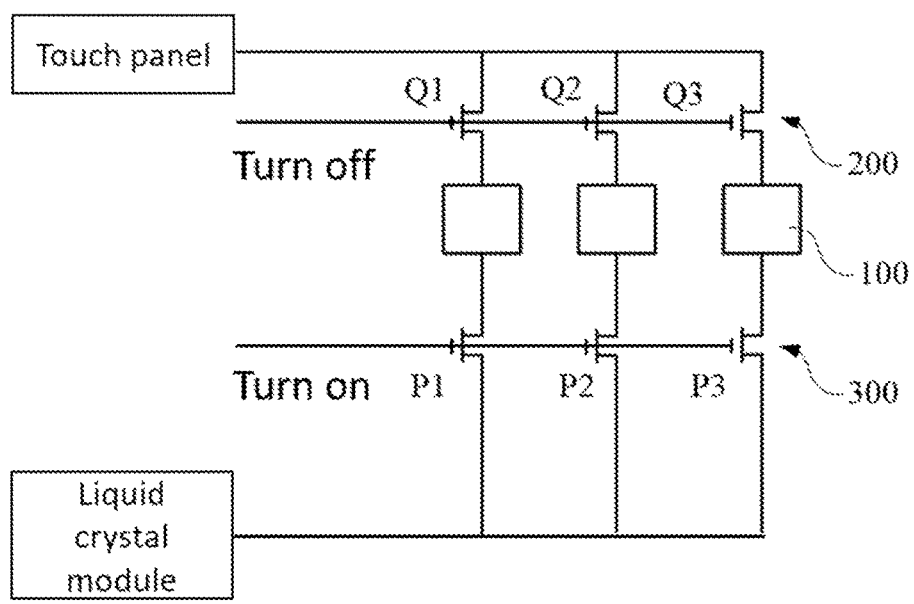
FIG. 4 illustrates a schematic circuit structure of performing a cell test by using a cell test pad.

During the Cell test, a closing signal is provided to the first switch group 200, an open signal is provided to the second switch group 300, the cell test pad is used as the input terminal of the testing signal to complete the cell test; as illustrated in FIG. 4, FIG. 4 illustrates a schematic circuit structure of performing a cell test by using a cell test pad.

Figure 5:
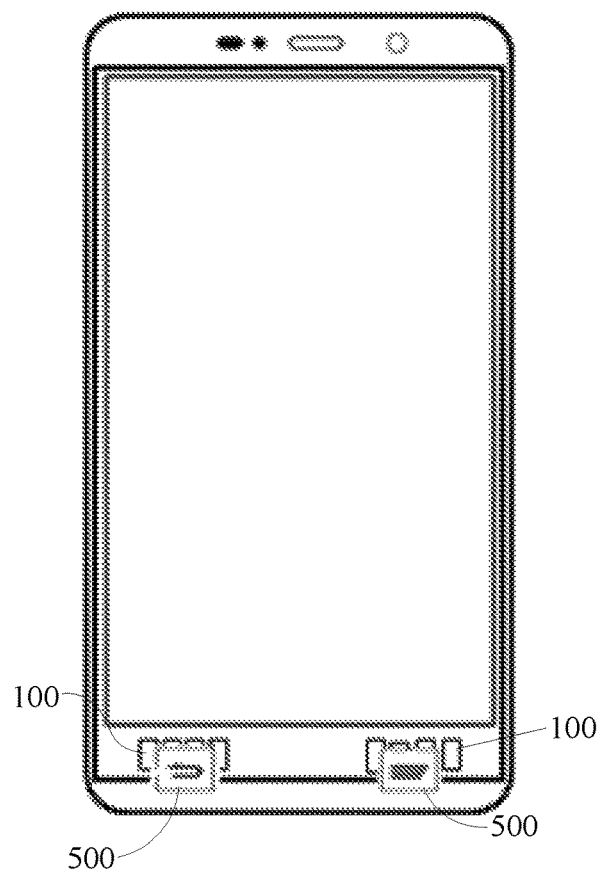
FIG. 5 illustrates a schematic structure of the Cell test PAD used as the Sensor PAD of the extending touch button.

In the embodiment, the cover plate dose not use the sensor formed by the FPC, and the cover plate directly adhesion to the LCD, the Cell test PAD of the left and right sides is overlapped with the extending required touch button, and the Cell test PAD is used as the Sensor PAD of the extending touch button. Referring to FIG. 5, FIG. 5 illustrates a schematic structure of the Cell test PAD used as the Sensor PAD of the extending touch button. Wherein the Touch Sensor in the extension region of the present embodiment is not limited to self capacitance type and mutual capacitance type.

Figure 6:
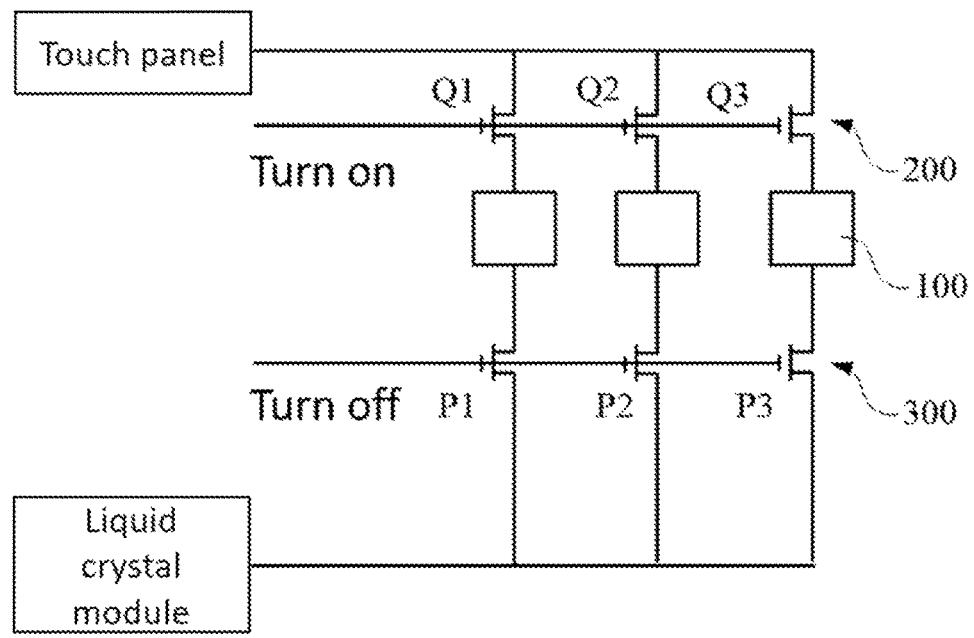
FIG. 6 illustrates a schematic circuit structure of using the cell test pad as a touch sensor.

When using the Cell Test pad acts as the function of the touch sensor to perform the cell testing, an open signal is provided to the first switch group 200, a close signal is provided to the second switch group 300, the Cell Test pad acts as the function of the touch sensor, detecting the touch signal to achieve the function of the touch button. As illustrated in FIG. 6, FIG. 6 illustrates a schematic circuit structure of using the cell test pad as a touch sensor.

With respect to the conventional technology, the touch button used in the touch display device of the present application, by adding the switches and the switching control signal to perform multiplexing to the Cell test PAD (test lead endplate), and use the cell test PAD as the sensor of the extension region, and further integrate the additional Touch function into the Cell. The technical improvements and advantages: 1, no additional Sensor FPC makes the structure of the touch display device more simple; 2, Eliminating the process of adhesion the FPC and the cove plate, so that the process of the touch display device is simplified; 3, improve the level of the Touch function integration; 4, improve the level of driving integration; 5, improve the utilization efficiency of the Panel.

Further, the embodiments of the present application further provides a touch display device, the touch display device includes a touch button.

The touch button includes the touch sensor 100, a first switch group 200 and a second switch group 300; each switch group includes a plurality of switches, terminals of the switches of the first switch group 200 are connected respectively to the touch panel, the other terminals are connected to the touch sensor 100 respectively; terminals of the switches of the second switch group 300 are connected respectively to the touch sensor 100, the other terminals are connected to the liquid crystal module; the touch sensor 100 is overlapped with the touch button area 500 of the touch display device. It should be noted that the Cell types in the embodiment of the present application can include non-embedded TP Cell, Incell, or Oncell like.

Preferably, the touch sensor 100 is a test lead endplate of the touch panel display, the test lead endplate is disposed on the border of the display area of the touch display device. The first switch group 200 is disconnect, the second switch group 300 is closed, the test lead endplate is as a touch sensor to detect the touch signal of the touch button area.

Specifically, the present application is multiplexing designed to the cell, the first switch group 200 (Q1, Q2, Q3 . . . illustrated in FIG.) and the second switch group 300 (P1, P2, P3 . . . illustrated in FIG.) are increased respectively in the cell test PAD of the right and left two sides; in the present embodiment, the first switch group 200 and the second switch group 300 includes three switches respectively, of course, in other embodiments, it can include a plurality of switches, the number of switches is not specifically limited here. The switch of the first switch group 200 and the second switch group 300 can be TFT switch, for example, P-type, N-type, C-type and etc. The shape of the Cell test PAD is not limited to a square shape shown in the figure, it can also be circular, etc., it can be understood by the person skilled in the art, and not list them here.

The number of the test lead endplate can be two, and each of the test lead endplate includes three lead ends, the three lead ends are connected to the switches of the first and the second switch group respectively. Of course, the number of test lead endplate can be a plurality. A touch panel control (TP control) signal is added in the input side of the right and left sides of the first switch group 200 respectively.

During the Cell test, a closing signal is provided to the first switch group 200, an open signal is provided to the second switch group 300, the cell test pad is used as the input terminal of the testing signal to complete the cell test; as illustrated in FIG. 4, FIG. 4 illustrates a schematic circuit structure of performing a cell test by using a cell test pad.

In the embodiment, the cover plate dose not use the sensor formed by the FPC, and the cover plate directly adhesion to the LCD, the Cell test PAD of the left and right sides is overlapped with the extending required touch button, and the Cell test PAD is used as the Sensor PAD of the extending touch button. Referring to FIG. 5, FIG. 5 illustrates a schematic structure of the Cell test PAD used as the Sensor PAD of the extending touch button. Wherein the Touch Sensor in the extension region of the present embodiment is not limited to self-capacitance type and mutual capacitance type.

When using the Cell Test pad acts as the function of the touch sensor to perform the cell testing, an open signal is provided to the first switch group 200, a close signal is provided to the second switch group 300, the Cell Test pad acts as the function of the touch sensor, detecting the touch signal to achieve the function of the touch button. As illustrated in FIG. 6, FIG. 6 illustrate a schematic circuit structure of using the cell test pad as a touch sensor.

Figure 7:
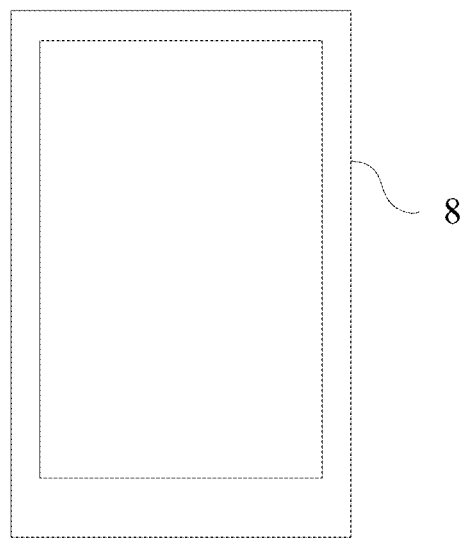
FIG. 7 illustrates a schematic structure of a mobile terminal according to a preferred embodiment of the present application.

Further, the embodiment of the present application also provides a mobile terminal, referring to FIG. 7, FIG. 7 illustrates a schematic structure of a mobile terminal according to a preferred embodiment of the present application. Wherein, the mobile terminal includes a housing 8 and the touch display device described in the above embodiments formed inside the housing 8. About the technical features of the touch display device can refer to the detail description of the above embodiments, while the technical features of the rest part of the structure of the mobile terminal, is in the understanding scope to the person skilled in the art, also not repeat here.

With respect to the conventional technology, the touch button used in the touch display device of the present application, by adding the switches and the switching control signal to perform multiplexing to the Cell test PAD (test lead endplate), and use the cell test PAD as the sensor of the extension region, and further integrate the additional Touch function into the Cell. The technical improvements and advantages: 1, no additional Sensor FPC makes the structure of the touch display device more simple; 2, Eliminating the process of adhesion the FPC and the cove plate, so that the process of the touch display device is simplified; 3, improve the level of the Touch function integration; 4, improve the level of driving integration; 5, improve the utilization efficiency of the Panel.

Above are embodiments of the present application, which does not limit the scope of the present application. Any modifications, equivalent replacements or improvements within the spirit and principles of the embodiment described above should be covered by the protected scope of the invention.

What is claimed is:

1. A touch button used in a touch display device, wherein the touch button comprises a touch sensor, a first switch group and a second switch group; the first switch group and the second switch group comprise three switches respectively, terminals of the switches of the first switch group are respectively connected to a touch panel, other terminals are connected to the touch sensor respectively; terminals of the switches of the second switch group are respectively connected to the touch sensor, other terminals are connected to a liquid crystal module; the touch sensor is overlapped with a touch button area of the touch display device; the touch sensor is a test lead endplate of a touch panel display, a number of the test lead endplates is two, each test lead endplate comprises three lead ends, the three lead ends are connected to the switches of the first switch group and the second switch group respectively; and the test lead endplate is disposed on a border of a display area of the touch display device.

2. The touch button according to claim 1, wherein when the first switch group is disconnect, the second switch group is closed, the test lead endplate is used for a light-on test of the liquid crystal module; when the first switch group is closed, the second switch group is disconnect, the test lead endplate is as a touch sensor to detect a touch signal of the touch button area.

3. The touch button according to claim 1, wherein a switch of the first switch group is a TFT switch, a source electrode of the TFT switch is connected to the touch panel, a drain electrode of the TFT switch is connected to the touch sensor, and a gate electrode of the TFT switch is connected to a switch controller.

4. The touch button according to claim 1, wherein a switch of the second switch group is a TFT switch, a source electrode of the TFT switch is connected to the display module, a drain electrode of the TFT switch is connected to the touch sensor, and a gate electrode of the TFT switch is connected to a switch controller.

5. A touch display device having a touch button, wherein the touch button comprises a touch sensor, a first switch group and a second switch group; the first switch group and the second switch group comprise three switches respectively, terminals of the switches of the first switch group are respectively connected to a touch panel, other terminals are connected to the touch sensor respectively; terminals of the switches of the second switch group are respectively connected to touch sensor, other terminals are connected to a liquid crystal module; the touch sensor is overlapped with a touch button area of the touch display device; the touch sensor is a test lead endplate of the a touch panel display, a number of the test lead endplates is two, each test lead endplate comprises three lead ends, the three lead ends are connected to the switches of the first switch group and the second switch group respectively; and the test lead endplate is disposed on a border of a display area of the touch display device.

6. The touch display device according to claim 5, wherein when the first switch group is disconnect, the second switch group is closed, the test lead endplate is used for a light-on test of the liquid crystal module; when the first switch group is closed, the second switch group is disconnect, the test lead endplate is as a touch sensor to detect a touch signal of the touch button area.

7. The touch button according to claim 5, wherein a switch of the first switch group is a TFT switch, a source electrode of the TFT switch is connected to the touch panel, a drain electrode of the TFT switch is connected to the touch sensor, and a gate electrode of the TFT switch is connected to a switch controller.

8. The touch button according to claim 5, wherein a switch of the second switch group is a TFT switch, a source electrode of the TFT switch is connected to the display module, a drain electrode of the TFT switch is connected to the touch sensor, and a gate electrode of the TFT switch is connected to a switch controller.

9. A mobile terminal, wherein the mobile terminal has a touch display device, the touch display device has a touch button, the touch button comprises a touch sensor, a first switch group and a second switch group; the first switch group and the second switch group comprise three switches respectively, terminals of the switches of the first switch group are respectively connected to a touch panel, other terminals are connected to the touch sensor respectively; terminals of the switches of the second switch group are respectively connected to the touch sensor, other terminals are connected to a liquid crystal module; the touch sensor is overlapped with a touch button area of the touch display device; the touch sensor is a test lead endplate of a touch panel display, a number of the test lead endplates is two, each test lead endplate comprises three lead ends, the three lead ends are connected to the switches of the first switch group and the second switch group respectively; and the test lead endplate is disposed on a border of a display area of the touch display device.

10. The mobile terminal according to claim 9, wherein when the first switch group is disconnect, the second switch group is closed, the test lead endplate is used for a light-on test of the liquid crystal module; when the first switch group is closed, the second switch group is disconnect, the test lead endplate is as a touch sensor to detect a touch signal of the touch button area.

11. The mobile terminal according to claim 9, wherein a switch of the first switch group is a TFT switch, a source electrode of the TFT switch is connected to the touch panel, a drain electrode of the TFT switch is connected to the touch sensor, and a gate electrode of the TFT switch is connected to a switch controller.

12. The mobile terminal according to claim 9, wherein a switch of the second switch group is a TFT switch, a source electrode of the TFT switch is connected to the display module, a drain electrode of the TFT switch is connected to the touch sensor, and a gate electrode of the TFT switch is connected to a switch controller.

* * * * *